US012561459B1

(12) United States Patent
Chavez et al.

(10) Patent No.: US 12,561,459 B1
(45) Date of Patent: *Feb. 24, 2026

(54) CONFIDENTIAL INFORMATION TRACKING SYSTEM

(71) Applicant: United Services Automobile Association (USAA), San Antonio, TX (US)

(72) Inventors: Carlos Chavez, San Antonio, TX (US); Michael J. Szentes, San Antonio, TX (US); Subhalakshmi Selvam, Allen, TX (US); Sean C. Mitchem, San Antonio, TX (US)

(73) Assignee: United Services Automobile Association (USAA), San Antonio, TX (US)

( * ) Notice: Subject to any disclaimer, the term of this patent is extended or adjusted under 35 U.S.C. 154(b) by 22 days.

This patent is subject to a terminal disclaimer.

(21) Appl. No.: 18/772,803

(22) Filed: Jul. 15, 2024

Related U.S. Application Data

(63) Continuation of application No. 17/528,966, filed on Nov. 17, 2021, now Pat. No. 12,093,410.

(Continued)

(51) Int. Cl.
*G06F 21/62* (2013.01)
*G06F 21/84* (2013.01)
(Continued)

(52) U.S. Cl.
CPC .............. *G06F 21/62* (2013.01); *G06F 21/84* (2013.01); *G06N 20/00* (2019.01); *G06V 20/52* (2022.01);
(Continued)

(58) Field of Classification Search
CPC .......... G06F 21/62; G06F 21/84; G06F 21/31; G06F 2221/2111; G06N 20/00;
(Continued)

(56) References Cited

U.S. PATENT DOCUMENTS 7,991,388 B1 8/2011 Becker et al.
9,245,500 B1 1/2016 Zhang
(Continued)

FOREIGN PATENT DOCUMENTS

KR 20160053691 A 5/2016

*Primary Examiner* — Hee K Song
(74) *Attorney, Agent, or Firm* — Potomac Law Group, PLLC; Dannon G. Allbee

(57) ABSTRACT

Methods and systems can protect information shown on a screen of a device. A user associated with the device can be authenticated, e.g., using photo identification of the user. In response to authenticating the user, data can be displayed on the device. A camera associated with the device can be automatically activated to take one or more images in response to a triggering event, a predetermined time interval, or randomly generated time intervals. An enhanced privacy environment is detected by analyzing the one or more images to identify that there are more than a threshold number of faces or people in the picture, or by identifying that the user is not in the picture based on a comparison of the picture to the photo identification of the user. In response to detecting the enhanced privacy environment, a privacy mode is enabled. The privacy mode can include various security measures such as concealing sensitive content or providing various security notifications.

20 Claims, 9 Drawing Sheets

Related U.S. Application Data

(60) Provisional application No. 63/122,348, filed on Dec. 7, 2020.

(51) Int. Cl.

| | |
|---|---|
| *G06N 20/00* | (2019.01) |
| *G06V 20/52* | (2022.01) |
| *G06V 40/16* | (2022.01) |
| *G10L 17/06* | (2013.01) |
| *H04N 7/18* | (2006.01) |
| *G06F 21/31* | (2013.01) |

(52) U.S. Cl.
CPC .......... *G06V 40/161* (2022.01); *G06V 40/172* (2022.01); *G10L 17/06* (2013.01); *H04N 7/188* (2013.01); *G06F 21/31* (2013.01); *G06F 2221/2111* (2013.01)

(58) Field of Classification Search
CPC .... G06V 20/52; G06V 40/172; G06V 40/161; G10L 17/06; H04N 7/188
See application file for complete search history.

(56) References Cited

U.S. PATENT DOCUMENTS

| | | | |
|---|---|---|---|
| 2005/0140572 A1* | 6/2005 | Kahan | G09C 5/00 |
| | | | 345/7 |
| 2005/0164675 A1 | 7/2005 | Tuulos et al. | |
| 2012/0036452 A1 | 2/2012 | Coleman et al. | |
| 2012/0254737 A1 | 10/2012 | Levien et al. | |
| 2012/0260307 A1 | 10/2012 | Sambamurthy et al. | |
| 2013/0006848 A1 | 1/2013 | Kuttuva | |
| 2013/0254874 A1 | 9/2013 | Xu | |
| 2014/0310804 A1 | 10/2014 | Apostolos et al. | |
| 2015/0026580 A1 | 1/2015 | Kang et al. | |
| 2015/0135298 A1 | 5/2015 | Robison et al. | |
| 2015/0286804 A1 | 10/2015 | Major | |
| 2021/0195160 A1* | 6/2021 | Gu | H04N 13/161 |
| 2022/0100874 A1* | 3/2022 | Singh | G06F 21/6218 |
| 2023/0342490 A1* | 10/2023 | Funakou | G06F 3/16 |

* cited by examiner

100

101
102
103

502 — authenticate user

504 — check user's privacy environment

506 — enable privacy mode

508 — use XR device to privately show concealed data 186-25-5598

806

802

ARDE-TP-5598

804

800

CONFIDENTIAL INFORMATION TRACKING SYSTEM

CROSS-REFERENCE TO RELATED APPLICATION

This application is a continuation of U.S. application Ser. No. 17/528,966, filed on Nov. 17, 2021, entitled "CONFIDENTIAL INFORMATION TRACKING SYSTEM", which is a non-provisional of U.S. Provisional Application No. 63/122,348, filed on Dec. 7, 2020, entitled "CONFIDENTIAL INFORMATION TRACKING SYSTEM," which are hereby incorporated by reference in their entireties for all purposes.

TECHNICAL FIELD

The present disclosure is generally directed to automatically enhancing security for devices detected to be in insecure environment.

BACKGROUND

Many companies allow users to work in environments that are not secure, such as their homes or common areas like coffee shops. The user may access personal data such as social security numbers, credit card numbers, employment data, etc., while they are working, and the personal data may be displayed on the screen of their device. The displayed data may be viewed by other people in the area and thus compromised. The user may be unaware, for example, that someone is looking over their shoulder at the displayed data. In other situations, the user may leave their device unattended, such as in their home, and data may be compromised by a neighbor, roommate, or family member. Data breaches can lead to identify theft and significant problems for a company that fails to secure sensitive and personal data.

BRIEF DESCRIPTION OF THE DRAWINGS

The techniques introduced here may be better understood by referring to the following Detailed Description in conjunction with the accompanying drawings, in which like reference numerals indicate identical or functionally similar elements.

DETAILED DESCRIPTION

Figure 1:
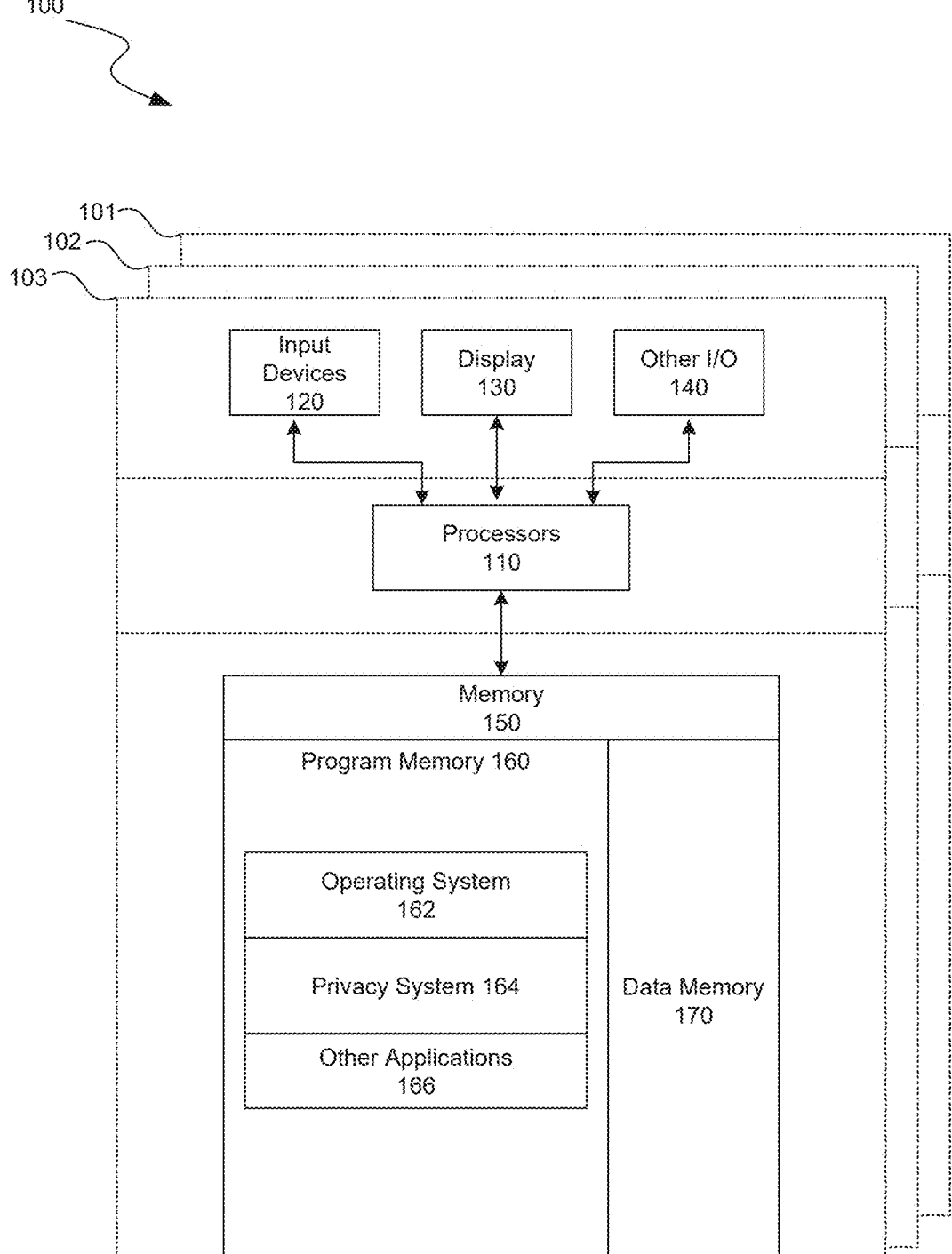
FIG. 1 is a block diagram illustrating an overview of devices on which some implementations of the present technology can operate.

Aspects of the present disclosure are directed to checking a user's privacy environment and implementing extra security when the need for an enhanced privacy environment is detected. Once a user has been authenticated, a number of different variables can be checked, either on a regular, intermittent or triggered basis, to detect the need for an enhanced privacy environment. If the enhanced privacy environment is detected, a privacy mode can be enabled that can include restrictions on the display of data on the device and/or access to the device. In some cases, an extra reality (XR) device can be used to privately show concealed or obscured data to the user.

In some embodiments, detecting the enhanced privacy environment can use pictures taken on a regular or variable basis to ensure that the approved user is operating the device and is alone. The device may be used in a work situation in which sensitive or personal information is displayed, such as social security numbers, salary, personnel data, account numbers, etc. If a picture indicates that someone other than the user is present and/or someone is with the user, the privacy mode can obscure or remove some of all of the displayed data to prevent unauthorized access. In some cases, the device may be locked, and may or may not allow the user to re-authenticate while in the enhanced privacy environment. A message can be displayed on the device indicating that a security breach may have occurred, and a message may be transmitted to an office and/or administrator informing them of the potential security breach.

In other embodiments, the device can monitor one or more sensors (e.g., a microphone; motion sensor; one or more environment mapping sensors such as radar, lidar, sonar; etc.) to detect environmental concerns around the device. The sensors can monitor motion, changes in light, sound, or location, changes in the network connection, and the like. In some cases, if a threshold level for a sensor is exceeded, the sensor can be directed to obtain environment data. The data can be compared to predetermined levels (e.g., normal or expected levels) or compared to similar stored data types, such as to determine whether a recorded voice print matches the voice print of the user. One or more of the sensors can be used to determine a number of people proximate to the device. If the number is above a threshold, the enhanced privacy environment can be detected. If other factors are determined, e.g., noise level above a threshold, motion around the device indicative of a busy environment such as an open plan office or a coffee shop, the enhanced privacy environment can be detected.

In some embodiments, when the enhanced privacy environment is detected, the device can enable one or more different privacy modes. For example, the device can be locked. A warning message can be displayed and/or transmitted to another device, such as to an administrator at a company. Data can be removed from the display and/or obscured. In some cases, the user can then use an XR device to view obscured data. This provides a technological improvement by automatically altering the display of data to prevent viewing by unauthorized people. Sensitive data is secure and users can work in less secure environments, such as airports, airplanes, coffee shops, busy office environments and homes.

In yet other embodiments, the device and/or an associated server can detect improper access of documents and implement the enhanced privacy environment. For example, if access to restricted documents is detected, the camera can be commanded to take one or more pictures. Other sensor data may also be collected. The device can be secured such that the user has to re-authenticate, or the user may be prevented from re-authenticating or from accessing the sensitive data. In some cases, a security breach message can be sent to a remote server and/or displayed on the device.

The disclosed technology operates in the technological environment of securing digital devices from security breaches. The disclosed technology further provides an improvement to this technological environment, e.g., by automatically enabling security when a user may not be aware there is a security issue, such as if someone is looking over their shoulder or accessing their device if it is left unattended. The improvement is realized by protecting sensitive data from security breaches caused unknowingly or on purpose by the user, allowing the user to work securely in a less secure environment, such as from home, a temporary office, or public venue. The disclosed technology further provides a technological improvement that does not rely on the user implementing the enhanced privacy environment manually. An employer can thus securely protect their data and customer data by monitoring the environment around the device for potential security threats, and then automatically implementing the enhanced privacy environment based on the environmental data and/or receive notifications of threats.

Embodiments of the disclosed technology may include or be implemented in conjunction with an artificial reality system. Artificial reality or extra reality (XR) is a form of reality that has been adjusted in some manner before presentation to a user, which may include, e.g., virtual reality (VR), augmented reality (AR), mixed reality (MR), hybrid reality, or some combination and/or derivatives thereof. Artificial reality content may include completely generated content or generated content combined with captured content (e.g., real-world photographs). The artificial reality content may include video, audio, haptic feedback, or some combination thereof, any of which may be presented in a single channel or in multiple channels (such as stereo video that produces a three-dimensional effect to the viewer). Additionally, in some embodiments, artificial reality may be associated with applications, products, accessories, services, or some combination thereof, that are, e.g., used to create content in an artificial reality and/or used in (e.g., perform activities in) an artificial reality. The artificial reality system that provides the artificial reality content may be implemented on various platforms, including a head-mounted display (HMD) connected to a host computer system, a standalone HMD, a mobile device or computing system, a "cave" environment or other projection system, or any other hardware platform capable of providing artificial reality content to one or more viewers.

"Virtual reality" or "VR," as used herein, refers to an immersive experience where a user's visual input is controlled by a computing system. "Augmented reality" or "AR" refers to systems where a user views images of the real world after they have passed through a computing system.

For example, a tablet with a camera on the back can capture images of the real world and then display the images on the screen on the opposite side of the tablet from the camera. The tablet can process and adjust or "augment" the images as they pass through the system, such as by adding virtual objects. "Mixed reality" or "MR" refers to systems where light entering a user's eye is partially generated by a computing system and partially composes light reflected off objects in the real world. For example, a MR headset could be shaped as a pair of glasses with a pass-through display, which allows light from the real world to pass through a waveguide that simultaneously emits light from a projector in the MR headset, allowing the MR headset to present virtual objects intermixed with the real objects the user can see. "Artificial reality," "extra reality," or "XR," as used herein, refers to any of VR, AR, MR, or any combination or hybrid thereof.

Several implementations are discussed below in more detail in reference to the figures. FIG. 1 is a block diagram illustrating an overview of devices on which some implementations of the disclosed technology can operate. The devices can comprise hardware components of a computing system 100 that can automatically detect if data shown on a screen of a device might be comprised and protect the data and/or device. In various implementations, computing system 100 can include a single computing device 103 or multiple computing devices (e.g., computing device 101, computing device 102, and computing device 103) that communicate over wired or wireless channels to distribute processing and share input data. In some implementations, computing system 100 can include a stand-alone headset capable of providing a computer created or augmented experience for a user without the need for external processing or sensors. In other implementations, computing system 100 can include multiple computing devices such as a headset and a core processing component (such as a console, mobile device, or server system) where some processing operations are performed on the headset and others are offloaded to the core processing component. Example headsets are described below in relation to FIGS. 2A and 2B. In some implementations, position and environment data can be gathered only by sensors incorporated in the headset device, while in other implementations one or more of the non-headset computing devices can include sensor components that can track environment or position data.

Computing system 100 can include one or more processor(s) 110 (e.g., central processing units (CPUs), graphical processing units (GPUs), holographic processing units (HPUs), etc.) Processors 110 can be a single processing unit or multiple processing units in a device or distributed across multiple devices (e.g., distributed across two or more of computing devices 101-103).

Computing system 100 can include one or more input devices 120 that provide input to the processors 110, notifying them of actions. The actions can be mediated by a hardware controller that interprets the signals received from the input device and communicates the information to the processors 110 using a communication protocol. Each input device 120 can include, for example, a mouse, a keyboard, a touchscreen, a touchpad, a wearable input device (e.g., a haptics glove, a bracelet, a ring, an earring, a necklace, a watch, etc.), a camera (or other light-based input device, e.g., an infrared sensor), a microphone, or other user input devices.

Processors 110 can be coupled to other hardware devices, for example, with the use of an internal or external bus, such as a PCI bus, SCSI bus, or wireless connection. The processors 110 can communicate with a hardware controller for devices, such as for a display 130. Display 130 can be used to display text and graphics. In some implementations, display 130 includes the input device as part of the display, such as when the input device is a touchscreen or is equipped with an eye direction monitoring system. In some implementations, the display is separate from the input device. Examples of display devices are: an LCD display screen, an LED display screen, a projected, holographic, or augmented reality display (such as a heads-up display device or a head-mounted device), and so on. Other I/O devices 140 can also be coupled to the processor, such as a network chip or card, video chip or card, audio chip or card, USB, firewire or other external device, camera, printer, speakers, CD-ROM drive, DVD drive, disk drive, etc.

Computing system 100 can include a communication device capable of communicating wirelessly or wire-based with other local computing devices or a network node. The communication device can communicate with another device or a server through a network using, for example, TCP/IP protocols. Computing system 100 can utilize the communication device to distribute operations across multiple network devices.

The processors 110 can have access to a memory 150, which can be contained on one of the computing devices of computing system 100 or can be distributed across of the multiple computing devices of computing system 100 or other external devices. A memory includes one or more hardware devices for volatile or non-volatile storage, and can include both read-only and writable memory. For example, a memory can include one or more of random access memory (RAM), various caches, CPU registers, read-only memory (ROM), and writable non-volatile memory, such as flash memory, hard drives, floppy disks, CDs, DVDs, magnetic storage devices, tape drives, and so forth. A memory is not a propagating signal divorced from underlying hardware; a memory is thus non-transitory. The memory can be a non-transitory computer-readable storage medium that stores instructions that can be executed by a computing system. Memory 150 can include program memory 160 that stores programs and software, such as an operating system 162, privacy system 164, and other application programs 166. Memory 150 can also include data memory 170 that can include photo identification and/or other biometric information associated with the user, thresholds associated with sensor data, sample sensor data, audio/voice recordings, configuration data, settings, user options or preferences, etc., which can be provided to the program memory 160 or any element of the computing system 100.

Some implementations can be operational with numerous other computing system environments or configurations. Examples of computing systems, environments, and/or configurations that may be suitable for use with the technology include, but are not limited to, XR headsets, personal computers, server computers, handheld or laptop devices, cellular telephones, wearable electronics, gaming consoles, tablet devices, multiprocessor systems, microprocessor-based systems, set-top boxes, programmable consumer electronics, network PCs, minicomputers, mainframe computers, distributed computing environments that include any of the above systems or devices, or the like.

Figure 2A:
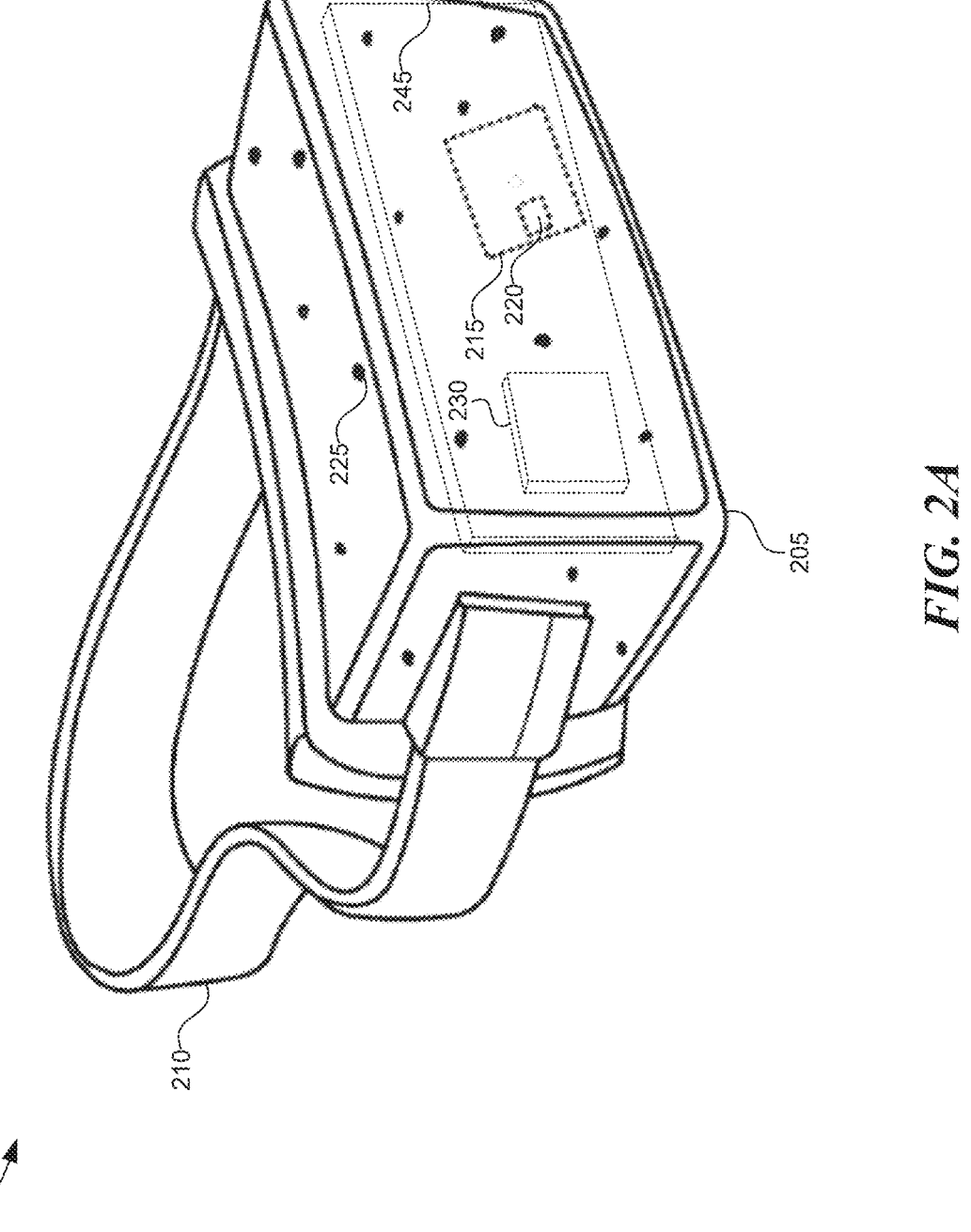
FIG. 2A is a wire diagram illustrating a virtual reality headset which can be used in some implementations of the present technology.

FIG. 2A is a wire diagram of a virtual reality head-mounted display (HMD) 200, in accordance with some embodiments. The HMD 200 includes a front rigid body 205 and a band 210. The front rigid body 205 includes one or more electronic display elements of an electronic display 245, an inertial motion unit (IMU) 215, one or more position sensors 220, locators 225, and one or more compute units 230. The position sensors 220, the IMU 215, and compute units 230 may be internal to the HMD 200 and may not be visible to the user. In various implementations, the IMU 215, position sensors 220, and locators 225 can track movement and location of the HMD 200 in the real world and in a virtual environment in three degrees of freedom (3 DoF) or six degrees of freedom (6 DoF). For example, the locators 225 can emit infrared light beams which create light points on real objects around the HMD 200. As another example, the IMU 215 can include e.g., one or more accelerometers, gyroscopes, magnetometers, other non-camera-based position, force, or orientation sensors, or combinations thereof. One or more cameras (not shown) integrated with the HMD 200 can detect the light points. Compute units 230 in the HMD 200 can use the detected light points to extrapolate position and movement of the HMD 200 as well as to identify the shape and position of the real objects surrounding the HMD 200.

The electronic display 245 can be integrated with the front rigid body 205 and can provide image light to a user as dictated by the compute units 230. In various embodiments, the electronic display 245 can be a single electronic display or multiple electronic displays (e.g., a display for each user eye). Examples of the electronic display 245 include: a liquid crystal display (LCD), an organic light-emitting diode (OLED) display, an active-matrix organic light-emitting diode display (AMOLED), a display including one or more quantum dot light-emitting diode (QOLED) sub-pixels, a projector unit (e.g., microLED, LASER, etc.), some other display, or some combination thereof.

In some implementations, the HMD 200 can be coupled to a core processing component such as a personal computer (PC) (not shown) and/or one or more external sensors (not shown). The external sensors can monitor the HMD 200 (e.g., via light emitted from the HMD 200) which the PC can use, in combination with output from the IMU 215 and position sensors 220, to determine the location and movement of the HMD 200.

In some implementations, the HMD 200 can be in communication with one or more other external devices, such as controllers (not shown) which a user can hold in one or both hands. The controllers can have their own IMU units, position sensors, and/or can emit further light points. The HMD 200 or external sensors can track these controller light points. The compute units 230 in the HMD 200 or the core processing component can use this tracking, in combination with IMU and position output, to monitor hand positions and motions of the user. The controllers can also include various buttons a user can actuate to provide input and interact with virtual objects. In various implementations, the HMD 200 can also include additional subsystems, such as an eye tracking unit, an audio system, various network components, etc. In some implementations, instead of or in addition to controllers, one or more cameras included in the HMD 200 or external to it can monitor the positions and poses of the user's hands to determine gestures and other hand and body motions.

Figure 2B:
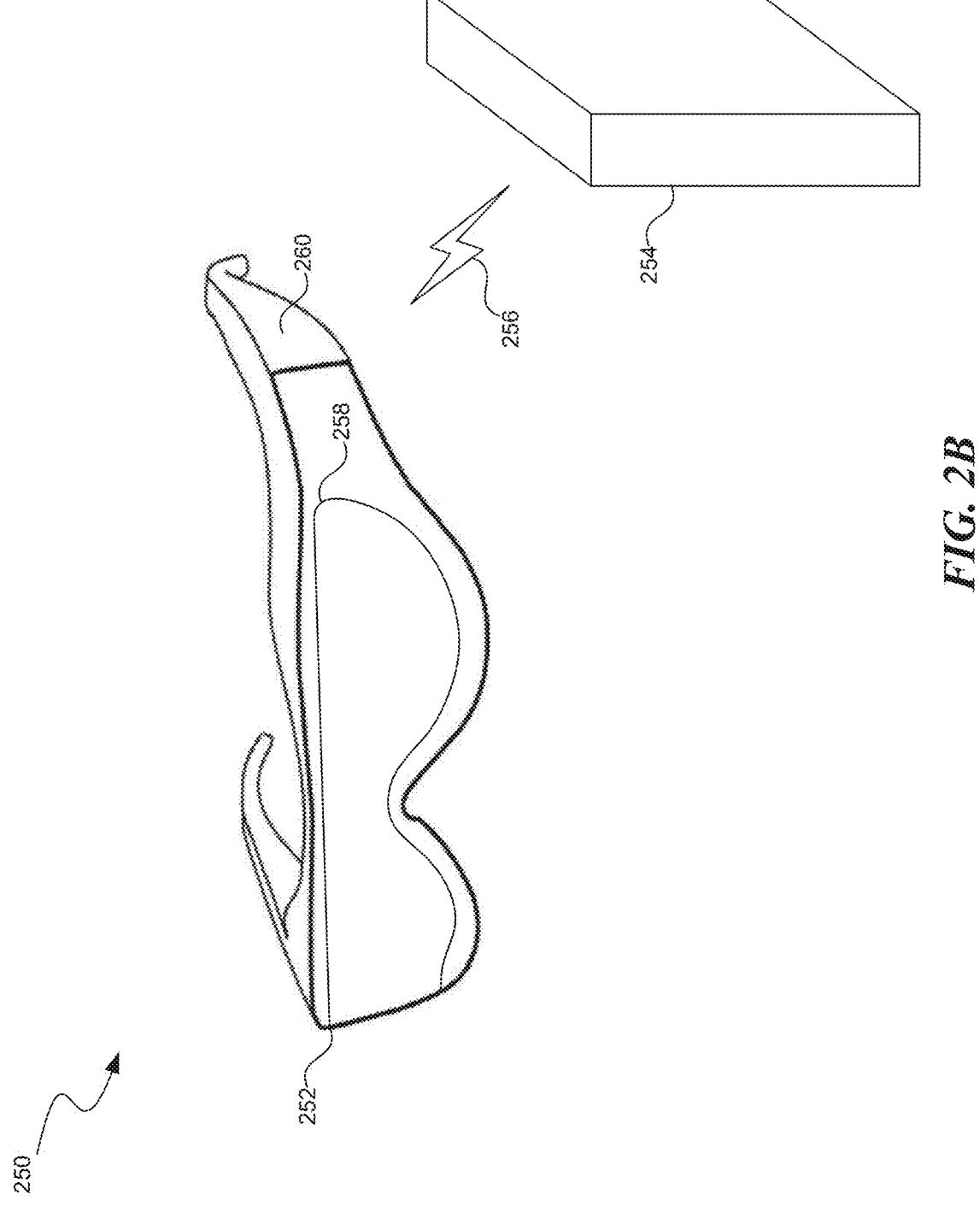
FIG. 2B is a wire diagram illustrating a mixed reality headset which can be used in some implementations of the present technology.

FIG. 2B is a wire diagram of a mixed reality HMD system 250 which includes a mixed reality HMD 252 and a core processing component 254. The mixed reality HMD 252 and the core processing component 254 can communicate via a wireless connection (e.g., a 60 GHz link) as indicated by link 256. In other implementations, the mixed reality system 250 includes a headset only, without an external compute device or includes other wired or wireless connections between the mixed reality HMD 252 and the core processing component 254. The mixed reality HMD 252 includes a pass-through display 258 and a frame 260. The frame 260 can house various electronic components (not shown) such as light projectors (e.g., LASERs, LEDs, etc.), cameras, eye-tracking sensors, MEMS components, networking components, etc.

The projectors can be coupled to the pass-through display 258, e.g., via optical elements, to display media to a user. The optical elements can include one or more waveguide assemblies, reflectors, lenses, mirrors, collimators, gratings, etc., for directing light from the projectors to a user's eye. Image data can be transmitted from the core processing component 254 via link 256 to HMD 252. Controllers in the HMD 252 can convert the image data into light pulses from the projectors, which can be transmitted via the optical elements as output light to the user's eye. The output light can mix with light that passes through the display 258, allowing the output light to present virtual objects that appear as if they exist in the real world.

Similarly to the HMD 200, the HMD system 250 can also include motion and position tracking units, cameras, light sources, etc., which allow the HMD system 250 to, e.g., track itself in 3 DoF or 6 DoF, track portions of the user (e.g., hands, feet, head, or other body parts), map virtual objects to appear as stationary as the HMD 252 moves, and have virtual objects react to gestures and other real-world objects.

Figure 3:
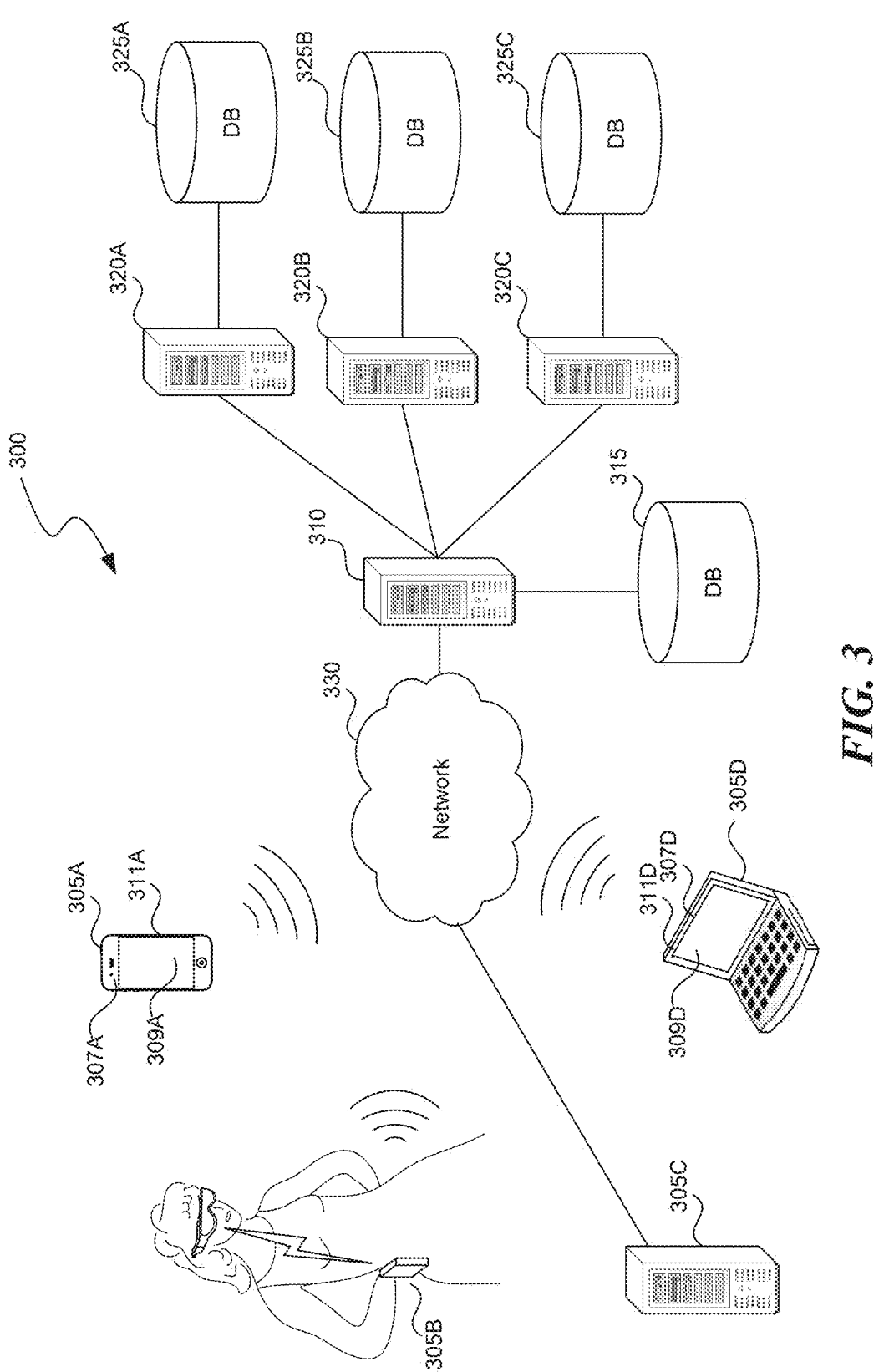
FIG. 3 is a block diagram illustrating an overview of an environment in which some implementations of the present technology can operate.

FIG. 3 is a block diagram illustrating an overview of an environment 300 in which some implementations of the disclosed technology can operate. Environment 300 can include one or more client computing devices 305A-D, examples of which can include computing system 100. In some implementations, some of the client computing devices (e.g., client computing device 305B) can be the HMD 200 or the HMD system 250. Client computing devices 305 can operate in a networked environment using logical connections through network 330 to one or more remote computers, such as a server computing device.

In some implementations, server 310 can be an edge server which receives client requests and coordinates fulfillment of those requests through other servers, such as servers 320A-C. Server computing devices 310 and 320 can comprise computing systems, such as computing system 100. Though each server computing device 310 and 320 is displayed logically as a single server, server computing devices can each be a distributed computing environment encompassing multiple computing devices located at the same or at geographically disparate physical locations.

Client computing devices 305 and server computing devices 310 and 320 can each act as a server or client to other server/client device(s). Server 310 can connect to a database 315. Servers 320A-C can each connect to a corresponding database 325A-C. As discussed above, each server 310 or 320 can correspond to a group of servers, and each of these servers can share a database or can have their own database. Though databases 315 and 325 are displayed logically as single units, databases 315 and 325 can each be a distributed computing environment encompassing multiple computing devices, can be located within their corresponding server, or can be located at the same or at geographically disparate physical locations.

Network 330 can be a local area network (LAN), a wide area network (WAN), a mesh network, a hybrid network, or other wired or wireless networks. Network 330 may be the Internet or some other public or private network. Client computing devices 305 can be connected to network 330 through a network interface, such as by wired or wireless communication. While the connections between server 310 and servers 320 are shown as separate connections, these connections can be any kind of local, wide area, wired, or wireless network, including network 330 or a separate public or private network.

The client computing devices 305 can include a camera such as cameras 307A or 307D. In some embodiments the camera 307 may be integrated with the client computing device 305, while in other embodiments the camera 307 may be separate from, but associated with, the client computing device 305. The client computing device 305 can control the camera 307, such as by activating the camera 307 (if necessary) and taking a picture or multiple pictures (e.g., a video). In other cases, a computer remote from the client computing device 305, such as the server 310, can initiate taking a picture by sending messages through the network 330.

The client computing devices 305 can also include a display, e.g. 309A or 309D. The client computing devices 305 can include, or be associated with, one or more sensors, e.g., sensors 311A and 311D. The sensors 311 can include a proximity sensor that can detect motion, changes in air pressure, or changes in light levels that are proximate the device 305, a microphone for detecting noise and/or voice prints, environment mapping sensors (e.g., sonar, radar, lidar, etc.), sensors that detect changes in wireless internet levels, etc.

Figure 4:
FIG. 4 is a block diagram illustrating components which, in some implementations, can be used in a system employing the disclosed technology.
Figure 4:
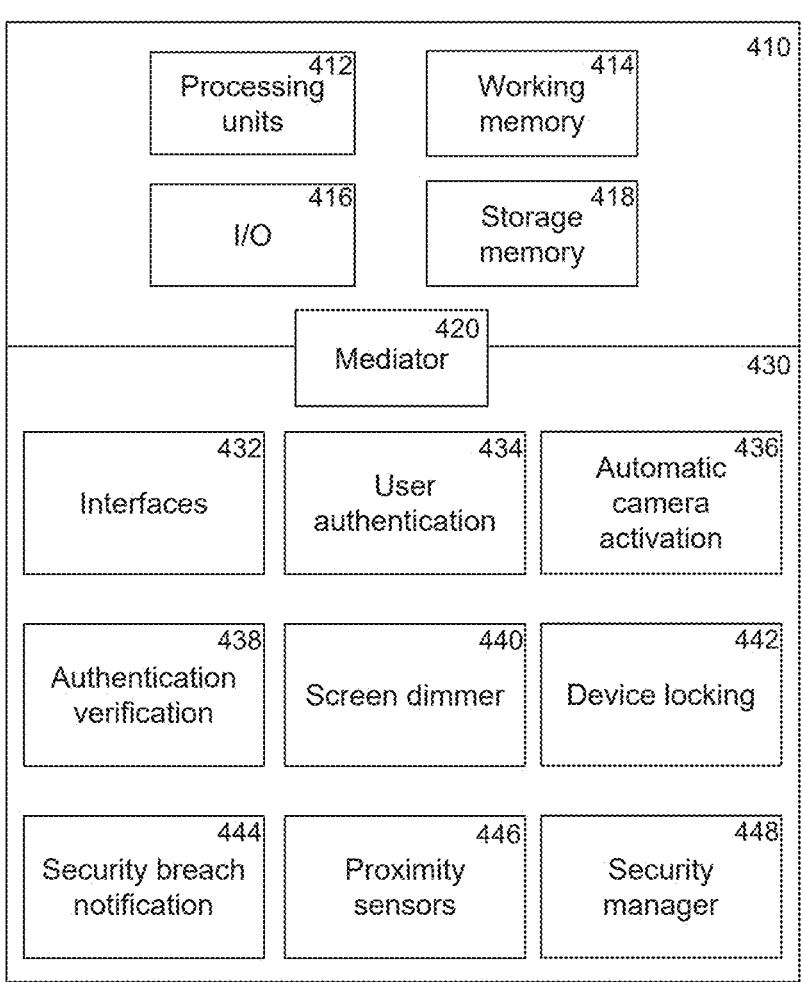

FIG. 4 is a block diagram illustrating components 400 which, in some implementations, can be used in a system employing the disclosed technology. Components 400 can be included in one device of computing system 100 or can be distributed across multiple of the devices of computing system 100. The components 400 include hardware 410, mediator 420, and specialized components 430. As discussed above, a system implementing the disclosed technology can use various hardware including processing units 412, working memory 414, input and output devices 416 (e.g., cameras, displays, IMU units, network connections, etc.), and storage memory 418. In various implementations, storage memory 418 can be one or more of: local devices, interfaces to remote storage devices, or combinations thereof. For example, storage memory 418 can be one or more hard drives or flash drives accessible through a system bus or can be a cloud storage provider (such as in storage 315 or 325) or other network storage accessible via one or more communications networks. In various implementations, components 400 can be implemented in a client computing device such as client computing devices 305 or on a server computing device, such as server computing device 310 or 320.

Mediator 420 can include components which mediate resources between hardware 410 and specialized components 430. For example, mediator 420 can include an operating system, services, drivers, a basic input output system (BIOS), controller circuits, or other hardware or software systems.

Specialized components 430 can include software or hardware configured to perform operations for checking the user's privacy environment for compromising situations and enabling a privacy mode to protect data displayed on the user's device. Specialized components 430 can include user authentication block 434, automatic camera activation block 436, authentication verification block 438, screen dimmer block 440, device locking block 442, security breach notification block 444, proximity sensors block 446, security manager block 448, and components and APIs which can be used for providing user interfaces, transferring data, and controlling the specialized components, such as interfaces

432. In some implementations, components 400 can be in a computing system that is distributed across multiple computing devices or can be an interface to a server-based application executing one or more of specialized components 430. Although depicted as separate components, specialized components 430 may be logical or other nonphysical differentiations of functions and/or may be submodules or code-blocks of one or more applications.

The user authentication block 434 can authenticate a user attempting to access the device 305. Additional details on authenticating the user in relation to block 434 are discussed below in relation to block 502 of FIG. 5. The automatic camera activation block 436 can automatically take a picture, either at a set time, random time, or in reaction to a trigger. The block 436 is further discussed below in relation to block 504 of FIG. 5 and block 604 of FIG. 6. The authentication verification block 438 can determine how many people are in a picture and if the user is in the picture. Details on the authentication verification in relation to block 438 are discussed below in relation to block 608 of FIG. 6. The screen dimmer block 440 can dim the display 309 of the device 305 in reaction to one or more triggers, as discussed further below in relation to block 506 of FIG. 5. The device locking block 442 can lock the device 305 when environmental security may be compromised. The block 442 is discussed further below in relation to block 506 of FIG. 5. The security breach notification block 444 can notify the user of the device 305 and/or another entity, such as the employer, of a potential security breach, as discussed further below in relation to block 506 of FIG. 5. The proximity sensors block 446 can obtain environmental data from the area around the device 305, and obtained data can be compared to predetermined levels and/or saved files to identify whether the obtained data indicates a security risk. Additional details on the proximity sensors 311 and the processing of associated data is discussed further below in relation to block 504 of FIG. 5 and blocks 604 and 606 of FIG. 6. The security manager block 448 can adjust one or more security levels, either automatically or based on user and/or administrator input, to allow the user to work in environments that may trigger one or more sensors 311, resulting in interruption of the user's work. The security levels of block 448 are discussed further below in relation to block 602 of FIG. 6.

Those skilled in the art will appreciate that the components illustrated in FIGS. 1-4 described above, and in each of the flow diagrams discussed below, may be altered in a variety of ways. For example, the order of the logic may be rearranged, substeps may be performed in parallel, illustrated logic may be omitted, other logic may be included, etc. In some implementations, one or more of the components described above can execute one or more of the processes described below.

Figure 5:
FIG. 5 is a flow diagram illustrating a process used in some implementations for checking a user's privacy environment for compromising situations and enabling a privacy mode to protect data displayed on the user's device in accordance with embodiments of the disclosed technology.
Figure 5:
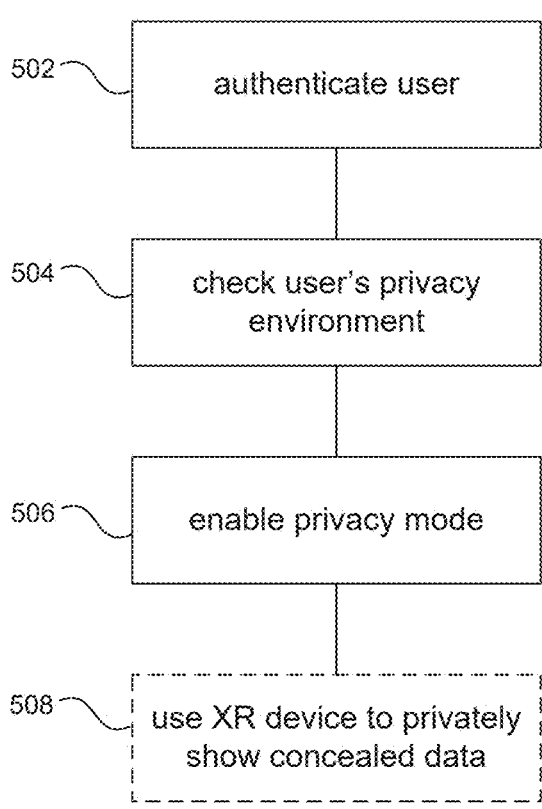

FIG. 5 is a flow diagram illustrating a process 500 used in some implementations for checking the user's privacy environment for compromising situations and enabling a privacy mode to protect data displayed on the user's device. The process 500 can automatically implement various security measures when triggered by a system or environmental event. FIG. 5 will be discussed together with FIGS. 6-8, which provide a more detailed description of the security and privacy measures taken by the system. By way of example, the figures will be discussed primarily with respect to the device 305 as shown in FIG. 3. Each of the devices 305A-D may implement all or some of the processes. In some implementations, some or all of process 500 can be performed "just in time," e.g., in response to an environ- mental or system trigger. In some implementations, some or all of process 500 can be performed on a schedule or randomly.

At block 502, the device 305 can authenticate the user. For example, the device 305 can access the camera 307 and take a picture. In other embodiments, the device 305 may collect other biometric information, such as fingerprint(s), retinal scan, voice print(s), AR biometrics, and/or Bluetooth or other wireless connection to device 305 (e.g., such as through a smart phone). In some cases, more than one form of data may be used to authenticate the user, such as a passcode and a picture, a passcode, a picture and a fingerprint, etc. The device 305 can compare the data to stored data associated with the user, such as stored photo identification of the user or other biometric data. Once the user has been authenticated, data can be displayed on the display 309 of the device 305.

At block 504, the device 305 can check the user's privacy environment based on certain triggers and/or conditions. For example, environmental triggers can be used to determine potential problems with the user's privacy environment that may result in compromised data. Additional details on checking the user's privacy environment based on certain triggers and/or conditions are discussed below in relation to FIG. 6.

If the device 305 determines that the privacy environment of the user may be compromised, at block 506 the device 305 can enable a privacy mode. The privacy mode can include one or more changes or actions that enhance the security and/or privacy of the device 305, such as locking the device 305 or obscuring sensitive content. In some cases the user is allowed to re-authenticate, and in other cases the user can be prevented from re-authenticating. The display 309 can be dimmed. In some embodiments, some or all data on the display 309 may be obscured by blurring, adding an overlay, or replacing characters with a default characters such as "X." In other embodiments, obscured data can be viewed by authorized users, e.g., using augmented reality glasses or virtual reality glasses (e.g., XR device), as discussed further below in connection with FIGS. 7 and 8. In still other embodiments, some or all of the displayed data may be removed from the display 309. For example, data can be obscured on a document by document basis, or on a field by field basis. Obscured or removed data can include sensitive information, such as social security numbers, account numbers and balances, addresses, names, sensitive company data such as employment and financial data, etc. The device 305 can notify the user and/or employer of a potential security issue, such as by displaying a message on the display 309 and/or automatically transmitting a security breach message to the employer (e.g., server 310). In some cases, a message can be transmitted through the network 330 to the server 310 to indicate that the privacy mode has been enabled, and may also include information indicating why the privacy mode was enabled.

In some cases, the privacy decision is binary and thus the predetermined privacy mode with a predetermined privacy level is turned on or off. In other implementations, a privacy mode and level can be set, for example, based on a confidence measure that the user is in a private environment, the sensitivity level of data being displayed, a type of the reason for enabling an enhanced privacy environment, the user's position in the company (e.g., a manager can have a different privacy mode/level than one of their employees). In some implementations, the actions taken to enable the privacy mode can be based on the determined level. For example, detecting that a user other than an authorized user can be mapped to a level for locking the device while detecting more than one person in the vicinity of the device can be mapped to a level for dimming the display. The privacy mode (or different privacy mode levels) can include various methods to conceal data and various methods to provide notifications. Concealing data can include, for example, locking the computer, removing or replacing sensitive data from the display, or dimming the display. Providing notifications can include notifying the user of the danger (which in some cases the user can respond to by allowing concealing data measures or overriding them) or notifying an administrator or owner of the device of the security issue.

In some cases, when certain environmental data such as noise or motion data is obtained (e.g., at block 604, discussed below) and exceeds a threshold value (block 606), the resulting privacy mode on device 305 can dim the display 309. This may indicate that the enhanced privacy environment is detected, but allows the user to take a simple action such as moving a mouse or selecting a key on the keyboard to revert back to a normal operation and screen intensity. This can provide a technical advantage of dimming the screen when another person is nearby and/or talking, even when the user is unaware of the other person. Accordingly, the unauthorized person is prevented from viewing the data, while the user is allowed to return to normal work flow with minimal required action.

If the privacy mode is enabled at block 506 and the device 305 has concealed the data, an XR device (such as device 200 or 250) can receive the data and privately display it to the user. Additional details on using an XR device to display private data are discussed further below in FIGS. 7 and 8.

Technical advantages of detecting unusual/restricted document access and/or unusual/unapproved/potentially unsafe or unsecured internet connections can prevent a person (different from the approved user) from accessing documents, and/or prevent the user from accessing documents they are not supposed to access, prevent the user from using the device 305 on an unsecure connection or in an unsecure location. Further technical advantages are realized by remotely monitoring environments around user devices for conditions that can lead to inadvertent or intentional compromise of data. Without acquiring and analyzing pictures, audio and/or other sensor data, an employer cannot know that the environment around the user is insecure.

Figure 6:
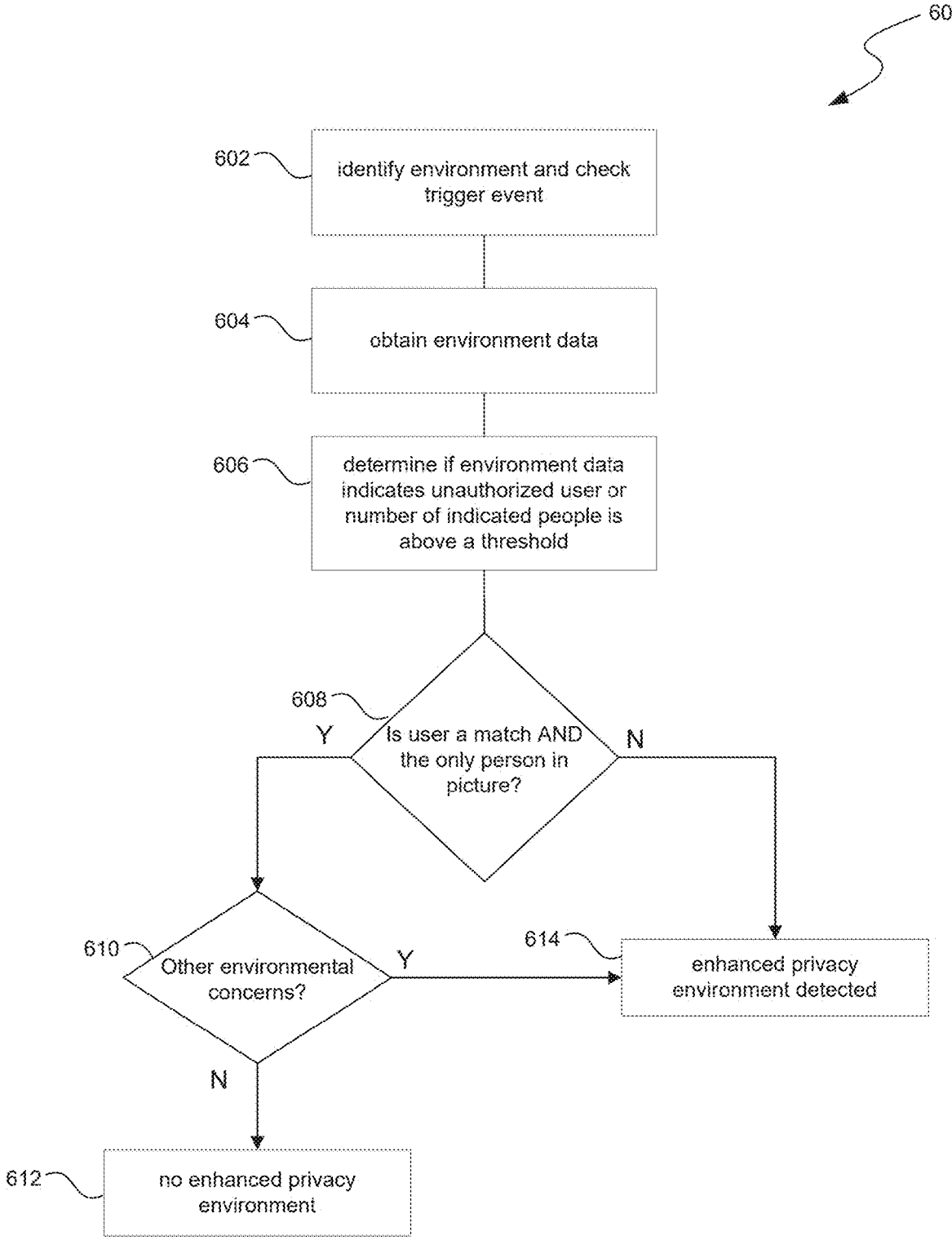
FIG. 6 is a flow diagram illustrating a process used in some implementations to automatically check the user's privacy environment to determine if a privacy mode should be enabled in accordance with embodiments of the disclosed technology.

FIG. 6 is a flow diagram illustrating a process 600 used in some implementations to automatically check the user's privacy environment to determine if the privacy mode should be enabled. In some cases, process 600 can be implemented, for example, by block 504 of FIG. 5 or in response to a trigger event, as discussed below.

At block 602, the device 305 can identify a number of different aspects of the environment around and related to the device 305 and can monitor different inputs and system notifications to identify a trigger event. A trigger event can initiate a process that can result in the device 305 acquiring data, analyzing data, etc. to determine if the environment is safe. The device 305 can monitor for and/or implement multiple triggers to ensure a secure data environment. For example, a trigger event can be a timer (regular intervals and/or random), data sensed by a proximity sensor 311 associated with the device 305 as discussed above in connection with FIG. 3, a global positioning system (GPS) associated with the user and/or the device 305, a detected change in the network connection of the device 305, a user command, an employer command (e.g., sent from the server 310 through the network 330), or access or attempted access of secured resources (e.g., restricted documents or databases). In some cases, attempted access of unusual documents outside of the user's normal workflow patterns or of restricted documents can initiate the triggering event. The triggering event may, in some cases, be generated by the server 310 which may control access to documents stored in the databases 315, 325.

When a trigger event occurs, at block 604 the device 305 can obtain environmental data. In some embodiments the device 305 may display an indication, such as a pop-up window or dialog box, to advise the user that a picture was taken or other environmental data was obtained. In some cases, particular triggers may be associated with one or more data collection actions. For example, if the timer expires, an image (e.g., picture) or video may be taken by the camera 307. If a sensor 311 detects data above a threshold, the sensor 311 may be activated to obtain environmental data. In one example, if a triggering event is associated with accessing certain documents or secured resources, the device 305 may take a picture. As discussed above with FIG. 3, the sensor 311 can detect motion, a change in air pressure, a change in light levels, noise, voice prints, changes in wireless internet levels, or other factors. In some implementations, the sensor 311 can map the environment (e.g., with sonar, radar, lidar, etc.), which can provide an indication of the shape or contours of objects (including people) in the surrounding area. This mapping data of the surroundings that can indicate factors such as number of people in the area or physical attributes of people in the area (which can be mapped to physical attributes of authorized users at block 608). Some sensors 311 may acquire audio/voice recordings. In some embodiments, one or more sensors 311 can use triangulation or other processing algorithms to determine the location of people moving in proximity to the device 305.

In another example, if the triggering event is associated with the device 305 using a new and/or unapproved internet connection, the device 305 may take a picture, obtain GPS data, and/or may also obtain other environmental data, such as sound levels, voice recordings, and/or various proximity sensors 311 that can acquire data indicative of activity level around the user. For example, the user may take the device 305 to a new location such as a coffee shop, library or airplane, and sign onto the available WiFi connection, which initiates a triggering event.

In some embodiments the environmental data can be stored locally on the device 305, while in other embodiments the environmental data can be transmitted over the network 330 to the server 310, and may be stored in the database 315, 325. In some cases, the environmental data may be retained until some or all associated privacy concerns have been resolved.

At block 606, the device 305 can determine if environmental data indicates that an unauthorized user may be present and/or viewing the data on the display 309, or if the number of people in the area proximate the device 305 is above a threshold. In some cases, the threshold may be one person (e.g., the user) if the sensitivity of the data being displayed is at a certain security level. In some embodiments, the device 305 can compare, such as by applying a machine learning model, obtained environmental data to stored data of the same data type. For example, an acquired voice recording can be compared to a stored voice recording of the user. A picture can be compared to stored photo identification of the user. Other sensor data (e.g., sonar, radar, lidar, etc.) can be used to map the environment and the results compared to threshold data types or prerecorded data, such as data recorded at the user's home or office.

In some embodiments, the device 305 can apply a machine learning model to analyze and compare the picture with the photo identification to determine if the user is in the picture, and also to determine whether there are other people in the picture. For example, the machine learning model may consider features such as head shape, shoulders, eyes, nose, etc., when identifying the number of faces and/or people in the picture.

A "model," as used herein, refers to a construct that is trained using training data to make predictions or provide probabilities for new data items, whether or not the new data items were included in the training data. For example, training data for supervised learning can include items with various parameters and an assigned classification. A new data item can have parameters that a model can use to assign a classification to the new data item. As another example, a model can be a probability distribution resulting from the analysis of training data, such as a likelihood of an n-gram occurring in a given language based on an analysis of a large corpus from that language. Examples of models include: neural networks, support vector machines, decision trees, Parzen windows, Bayes, clustering, reinforcement learning, probability distributions, decision trees, decision tree forests, and others. Models can be configured for various situations, data types, sources, and output formats.

At block 608, if the user is a match with a person in the picture and there are no other faces or people in the picture, the process passes to block 610 where the device 305 determines if there are other environmental concerns or if the number of indicated people in the environment is above a threshold (e.g., as identified at block 606). Other factors considered at block 610 may, result in enabling the privacy mode. For example, if no person is detected in the picture at block 608, the process can pass to 614. This situation may indicate that the user has left the device 305 unsecured. In another embodiment, further environmental factors such as the number of indicated people being above a threshold (block 606) may result in enabling the privacy mode (block 614). Therefore, even if the user is the only person in the picture (block 608), if the number of people in the surrounding environment is above a threshold the environment may not be secure. In some cases, this may be in a busy environment such as a coffee shop or an office that has an open environment where many people may move around the device 305. If no further privacy concerns are determined, the process passes to block 612 and there is no change in the current privacy mode of the device 305. If privacy concerns are determined, the process passes to block 614 (discussed below).

Alternatively, at block 608, if the user is a match and the only person in the picture, the process can pass directly to block 612, and there is no change in the current privacy mode of the device 305.

Returning to block 608, if either the user is not a match with a person in the picture or there is more than one person in the picture, an enhanced privacy environment is determined at block 614. In some cases, detecting a person who is not the user may indicate that an unauthorized person is viewing sensitive and/or restricted data on the display 309. The user may or may not be aware of the person viewing the data, such as when an unauthorized person is looking over the user's shoulder. In other cases, the user may have left the device 305 unattended and the unauthorized person is viewing the data.

The enhanced privacy environment can be a binary decision (e.g., on or off) or can set privacy factors based on the environmental data obtained at block 604. The privacy mode can be enabled as discussed in connection with FIG. 5 block 506 and/or FIG. 7 (discussed below). In other cases, levels of the environmental data can control or inform how the privacy mode is implemented on the device 305 at block 506 of FIG. 5.

In another embodiment, if the user and another person are identified in the picture at block 608, the enhanced privacy block 614 may trigger the GUI to request further information from the user. For example, the user could be requested to confirm whether or not the device 305 is secure. The user could also be asked if they can identify the other person in the picture. For example, the user may be working at home and have small children who move close to the device 305, resulting in the privacy mode being activated. The user may adjust the level of the privacy mode if they can confirm that the device 305 is safe and/or confirm the identity of the other person in the picture.

In yet another embodiment, if a minimum number of sensors 311, such as two sensors 311, indicate that the environment has multiple people moving about the device 305 (block 606), privacy mode may be enabled (block 614). This may happen in environments such as airports, offices, shopping malls, restaurants, etc.

In some embodiments, the user and/or an administrator can override one or more triggers, such as at block 602 or after the enhanced privacy environment has been detected to prevent continued interruptions. Accordingly, the user can be offered, such as through the GUI, an opportunity to adjust one or more security levels associated with the device 305. For example, the user may be working with a second person on the same device 305, and thus the restriction at block 608 may be temporarily overridden by not taking pictures or by allowing more people than the user to be in the picture for a predetermined period of time. In some cases, the user can be offered, such as through the GUI, an opportunity to adjust one or more security levels associated with the device 305. For example, the user can request a lower security level that allows the device 305 to ignore or block signals from one or more sensor 311, such as to prevent the user from being repeatedly interrupted when noise or air pressure changes are detected. For example, the user may be working in a noisy environment or experience short bursts of noise, changes in light, etc. that trigger one of the sensors 311. The user may be away from their home, as confirmed by GPS data, and able to override the obtaining of certain data (block 604), such as noise data, to prevent repeated interruptions of work flow. Therefore, the user can lower the security level. The user may have various people and/or pets moving around them in their home that trigger the sensor 311, and can set (or request an administrator to authorize) a lower security level. In some cases, the user can request a lower security level that allows the device 305 to connect to a new network connection. The security level adjustment may be temporary, such as for a predetermined time period or timeframe (e.g., one hour, two hours, every day from 9:00 am-4 pm, etc.). If the network connection is approved and added to a safe list, the user may not have to reconfirm the security level the next time they connect to the network connection. Alternatively, if the network connection is identified as secure, the user may be allowed to operation the device 305 without the enhanced privacy environment protections.

Accordingly, in some embodiments, the privacy mode associated with certain enhanced privacy environment conditions may be selected by and/or customized by the user or an administrator through the GUI, the network 330, or through settings associated with the device 305 and/or user.

In some embodiments, the device 305 can collect data from the user, such as through the GUI, associated with the potential security issues identified at blocks 604 and 606. The user may be asked, for example, if the network connection is secure and/or password protected. They may be requested to enter their location, such as an address and/or type of location (e.g., coffee shop, library, office, etc.). In some embodiments, the user may be able to add certain networks to a safe list, such as networks they access regularly from a relative or friend's house, or a co-working location. If the device 305 has detected unapproved access of documents, the user may be asked through the GUI to confirm the access and/or provide a reason for the access. In some cases the information entered by the user may be reviewed by a supervisor or other personnel at a location remote from the user, or by a machine learning model, to determine if the answer(s) satisfy security protocols. In other cases, the user may be asked to confirm the identity of others in the surrounding environment.

If the enhanced privacy environment is detected (block 614), the device 305 can transmit (e.g., as part of the security mode enabled at block 506) a potential security breach message, such as over the network 330 to the server 310, and may also display a security break message on the display 309. If a security breach is suspected, the device 305 may allow the user limited access or prevent all access.

Figure 7:
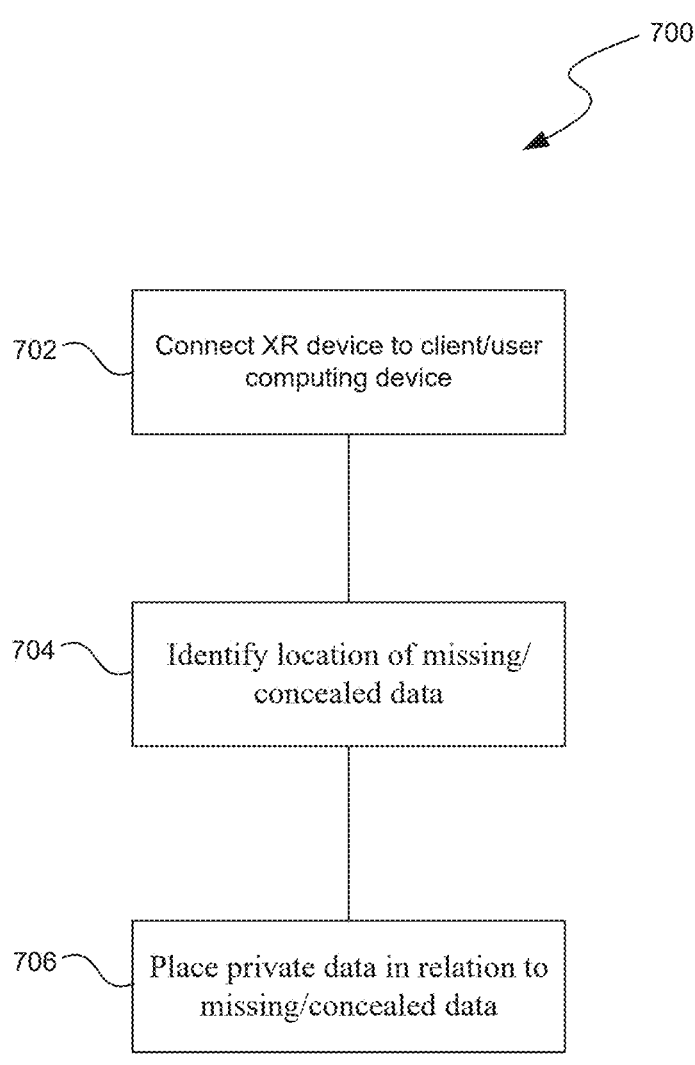
FIG. 7 is a flow diagram illustrating a process used in some implementations for using an extra reality (XR) device to view obscured data on a display in accordance with embodiments of the disclosed technology.

FIG. 7 is a flow diagram illustrating a process 700 used in some implementations for using an XR device to view obscured data on the display 309 of the device 305. The process 700 can be implemented, for example, by block 508 of FIG. 5. In some cases, the user can see that some of the data on the display 309 is obscured and thus is aware that they need to use an XR device to view the data. In other cases, a message on the display 309 can direct the user to connect an XR device to view the data. For example, the XR device can be the VR HMD 200 or the mixed reality HMD 252 as discussed previously in FIGS. 2A and 2B.

At block 702 the user can connect their XR device to the device 305 as discussed above in connection with FIGS. 2A and 2B. For example, connection may involve a connection over WiFi, the Internet, Bluetooth, etc. The device 305 can provide, to the XR device, a version of the data that was concealed on the display of the device 305 (e.g. an unencrypted version or an version encrypted with a key that the XR device can decrypt for display).

At block 704 the XR device can use objection detection, for example, to identify a real-world location of the missing and/or concealed data. For example, the XR device can take images of the display of the device 305 and, using computer vision techniques, can detect strings special characters that device 305 used to replace the sensitive content. In some implementations, device 305 can replace the sensitive content with markers (e.g., bar or QR codes, special patterns, special sequences of characters, light patters, etc.) that the XR device can identify. The XR device can then track these locations as the user moves her head, providing world-locked anchors for where data is concealed on the device 305.

At block 706, the XR device can use the anchor points determined at block 704 to place private data within the viewing screen of the XR device in relation to (e.g., over, next to, etc.) the missing and/or concealed data. For example, the XR device can decrypt the sensitive data, determine which marker on the display of the device 305 the data corresponds to, and can display the data, in human-readable form, at the corresponding anchor e.g., as an overlay or adjacent to the concealed version.

Figure 8:
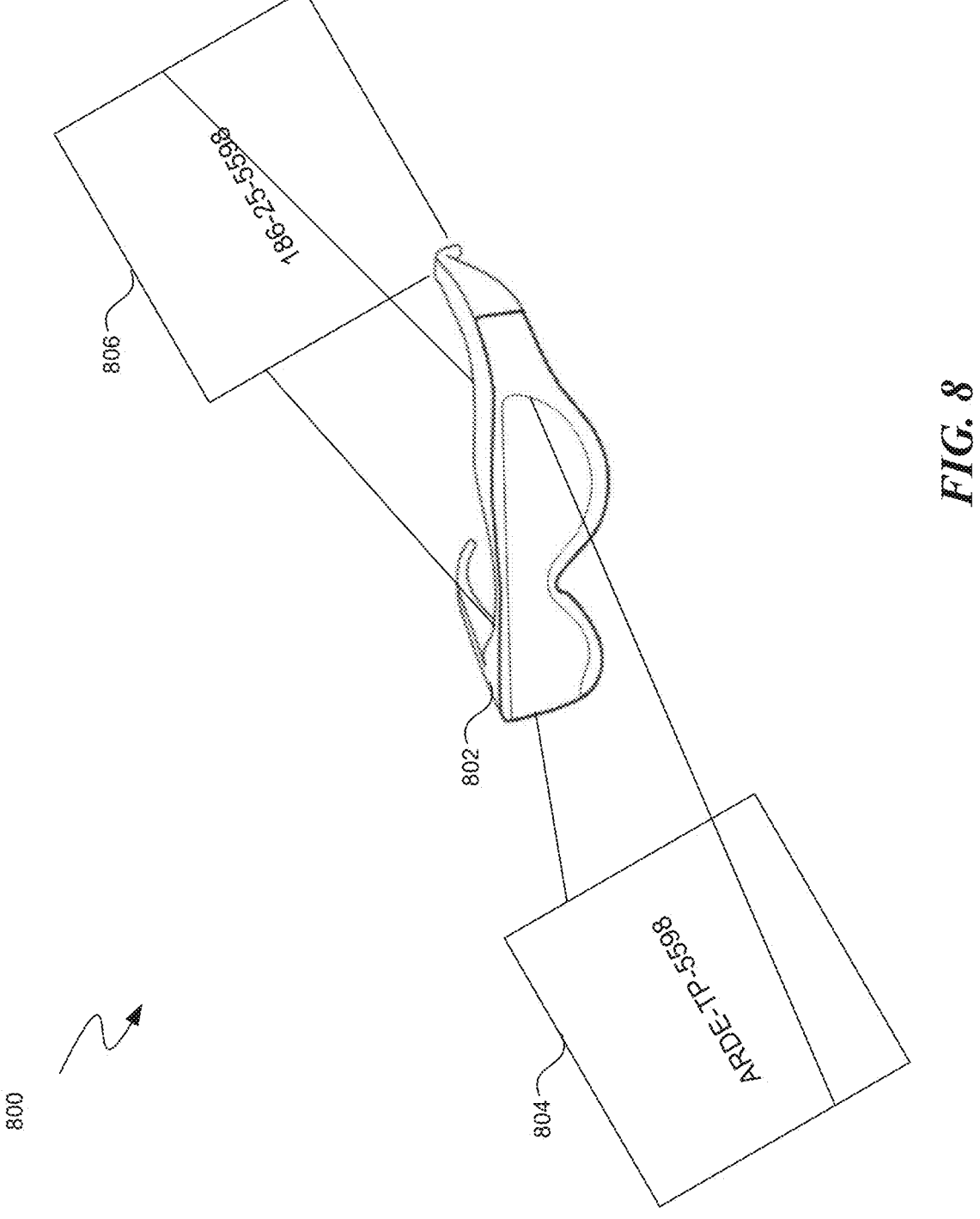
FIG. 8 is a conceptual diagram illustrating the viewing of obscured data using an XR device in accordance with embodiments of the disclosed technology.

FIG. 8 is a conceptual diagram 800 illustrating the display of personal or sensitive data using an XR device 802 as discussed in FIGS. 2A, 2B, and 7. Image 804 shows data obscured by the code "ARDE-TP" as the user may view it on the display 309 of the device 305 without the XR device 802. In this example, the display 309 is showing a social security number with the first five digits obscured. Image 806 indicates what the user sees while wearing the XR device 802. The XR device has identified the special code, determined its position and created a corresponding world-locked anchor, received the obscured information from the device 305, and has placed it as an overlay in human-readable form. Accordingly, a technological improvement is realized as the device 305 can automatically detect an insecure environment and automatically protect displayed data in a manner that allows the user is continue working without compromising private or sensitive data.

Reference in this specification to "implementations" (e.g., "some implementations," "various implementations," "one implementation," "an implementation," etc.) means that a particular feature, structure, or characteristic described in connection with the implementation is included in at least one implementation of the disclosure. The appearances of these phrases in various places in the specification are not necessarily all referring to the same implementation, nor are separate or alternative implementations mutually exclusive of other implementations. Moreover, various features are described which may be exhibited by some implementations and not by others. Similarly, various requirements are described which may be requirements for some implementations but not for other implementations.

As used herein, being above a threshold means that a value for an item under comparison is above a specified other value, that an item under comparison is among a certain specified number of items with the largest value, or that an item under comparison has a value within a specified top percentage value. As used herein, being below a threshold means that a value for an item under comparison is below a specified other value, that an item under comparison is among a certain specified number of items with the smallest value, or that an item under comparison has a value within a specified bottom percentage value. As used herein, being within a threshold means that a value for an item under comparison is between two specified other values, that an item under comparison is among a middle-specified number of items, or that an item under comparison has a value within a middle-specified percentage range. Relative terms, such as high or unimportant, when not otherwise defined, can be understood as assigning a value and determining how that value compares to an established threshold. For example, the phrase "selecting a fast connection" can be understood to mean selecting a connection that has a value assigned corresponding to its connection speed that is above a threshold.

As used herein, the word "or" refers to any possible permutation of a set of items. For example, the phrase "A, B, or C" refers to at least one of A, B, C, or any combination thereof, such as any of: A; B; C; A and B; A and C; B and C; A, B, and C; or multiple of any item such as A and A; B, B, and C; A, A, B, C, and C; etc.

Although the subject matter has been described in language specific to structural features and/or methodological acts, it is to be understood that the subject matter defined in the appended claims is not necessarily limited to the specific features or acts described above. Specific embodiments and implementations have been described herein for purposes of illustration, but various modifications can be made without deviating from the scope of the embodiments and implementations. The specific features and acts described above are disclosed as example forms of implementing the claims that follow. Accordingly, the embodiments and implementations are not limited except as by the appended claims.

Any patents, patent applications, and other references noted above are incorporated herein by reference. Aspects can be modified, if necessary, to employ the systems, functions, and concepts of the various references described above to provide yet further implementations. If statements or subject matter in a document incorporated by reference conflicts with statements or subject matter of this application, then this application shall control.

We claim:

1. A method for protecting information comprising sensitive content for a display of a device, the method comprising:

authenticating a user associated with the device;

receiving a request to access the information comprising the sensitive content;

detecting an enhanced privacy environment by one or both of:

identifying, based on applying a machine learning model to acquired one or more images, that there are more than a threshold number of people in the acquired one or more images; and/or identifying that the acquired one or more images does not contain the authenticated user; and in response to detecting the enhanced privacy environment, enabling a privacy mode comprising:

preventing the sensitive content from being decipherable on the display; and causing an artificial reality device, having a second display, to display second content allowing the sensitive content to be deciphered, wherein the second display displays, during the privacy mode, the second content at a location, determined by the artificial reality device, to be superimposed over a location determined to correspond to a location for the sensitive content on the display of the device.

2. The method of claim 1, wherein the enabling the privacy mode is in response to identifying more than one person in the acquired one or more images; and wherein the enabling the privacy mode further includes dimming the display of the device.

3. The method of claim 1, further comprising automatically displaying a dialog box on the display when the camera associated with the device is activated.

4. The method of claim 1, wherein the detecting the enhanced privacy environment is based on a triggering event, and wherein the triggering event is at least one of:

detecting an access or attempted access of content determined, based on identified workflow patterns associated with the authenticated user, to be outside normal data access activities of the authenticated user, and/or detecting an access or attempted access of resources specified as secured.

5. The method of claim 1, further comprising:

automatically activating a camera associated with the device, to capture the one or more images, in response to detecting a triggering event;

wherein, in response to detecting the triggering event, the method further comprises obtaining audio data with at least one microphone associated with the device, and wherein the detecting the enhanced privacy environment is further based on a determination that the audio data includes a voice of an unauthorized user or includes above a threshold number of voices.

6. The method of claim 1, wherein the detecting the enhanced privacy environment includes the identifying that there are more than a threshold number of people in the acquired one or more images; and wherein the threshold number of people in the one or more acquired images is one.

7. The method of claim 1, wherein enabling the privacy mode further includes automatically transmitting a security breach message.

8. The method of claim 1, wherein the detecting the enhanced privacy environment is based on a triggering event, wherein the triggering event is at least one of:

motion detected by a proximity sensor associated with the device, noise detected by a microphone associated with the device, detecting that a geographic location of the device, based on global positioning data, is outside a specified area, detecting that a network connection is different from a home or office network connection of the user, or any combination thereof.

9. The method of claim 1, wherein the preventing the sensitive content from being decipherable on the display includes replacing the sensitive content with one or more markers on the display of the device, and wherein the artificial reality device determines the location for second content by identifying the one or more markers on the display of the device.

10. A non-transitory computer-readable storage medium storing instructions, for protecting information comprising sensitive content for a display of a device, the instructions, when executed by a computing system, cause the computing system to:

authenticate a user associated with the device;

receive a request to access the information comprising the sensitive content;

detect an enhanced privacy environment by one or both of:

identifying, based on applying a machine learning model to acquired one or more images, that there are more than a threshold number of people in the acquired one or more images; and/or identifying that the acquired one or more images does not contain the authenticated user; and in response to detecting the enhanced privacy environment, enable a privacy mode comprising:

preventing the sensitive content from being decipherable on the display; and causing an artificial reality device, having a second display, to display second content allowing the sensitive content to be deciphered, wherein the second display displays, during the privacy mode, the second content at a location, determined by the artificial reality device, to be superimposed over a location determined to correspond to a location for the sensitive content on the display of the device.

11. The non-transitory computer-readable storage medium of claim 10, wherein the enabling the privacy mode is in response to identifying more than one person in the acquired one or more images; and wherein the enabling the privacy mode further includes dimming the display of the device.

12. The non-transitory computer-readable storage medium of claim 10, wherein the detecting the enhanced privacy environment is based on a triggering event, and wherein the triggering event is at least one of:

detecting an access or attempted access of content determined, based on identified workflow patterns associated with the authenticated user, to be outside normal data access activities of the authenticated user, and/or detecting an access or attempted access of resources specified as secured.

13. The non-transitory computer-readable storage medium of claim 10, wherein the instructions, when executed, further cause the computing system to:

automatically activate a camera associated with the device, to capture the one or more images, in response to detecting a triggering event;

wherein, in response to detecting the triggering event, the instructions, when executed, further cause the computing system to obtain audio data with at least one microphone associated with the device, and wherein the detecting the enhanced privacy environment is further based on a determination that the audio data includes a voice of an unauthorized user or includes above a threshold number of voices.

14. The non-transitory computer-readable storage medium of claim 10, wherein the detecting the enhanced privacy environment includes the identifying that there are more than a threshold number of people in the acquired one or more images; and wherein the threshold number of people in the one or more acquired images is one.

15. The non-transitory computer-readable storage medium of claim 10, wherein the detecting the enhanced privacy environment is based on a triggering event, wherein the triggering event is at least one of:

motion detected by a proximity sensor associated with the device, noise detected by a microphone associated with the device, detecting that a geographic location of the device, based on global positioning data, is outside a specified area, detecting that a network connection is different from a home or office network connection of the user, or any combination thereof.

16. The non-transitory computer-readable storage medium of claim 10, wherein the preventing the sensitive content from being decipherable on the display includes replacing the sensitive content with one or more markers on the display of the device, and wherein the artificial reality device determines the location for second content by identifying the one or more markers on the display of the device.

17. A computing system for protecting information comprising sensitive content for a display of a device, the computing system comprising:

one or more processors; and one or more memories storing instructions that, when executed by the one or more processors, cause the computing system to:

authenticate a user associated with the device;

receive a request to access the information comprising the sensitive content;

detect an enhanced privacy environment by one or both of:

identifying, based on applying a machine learning model to acquired one or more images, that there are more than a threshold number of people in the acquired one or more images; and/or identifying that the acquired one or more images does not contain the authenticated user; and in response to detecting the enhanced privacy environment, enable a privacy mode comprising:

preventing the sensitive content from being decipherable on the display; and causing an artificial reality device, having a second display, to display second content allowing the sensitive content to be deciphered, wherein the second display displays, during the privacy mode, the second content at a location, determined by the artificial reality device, to be superimposed over a location determined to correspond to a location for the sensitive content on the display of the device.

18. The computing system of claim 17, wherein the detecting the enhanced privacy environment is based on a triggering event, and wherein the triggering event is at least one of:

detecting an access or attempted access of content determined, based on identified workflow patterns associated with the authenticated user, to be outside normal data access activities of the authenticated user, and/or detecting an access or attempted access of resources specified as secured.

19. The computing system of claim 17, wherein the detecting the enhanced privacy environment is based on a triggering event, wherein the triggering event is at least one of:

motion detected by a proximity sensor associated with the device, noise detected by a microphone associated with the device, detecting that a geographic location of the device, based on global positioning data, is outside a specified area, detecting that a network connection is different from a home or office network connection of the user, or any combination thereof.

20. The computing system of claim 17, wherein the preventing the sensitive content from being decipherable on the display includes replacing the sensitive content with one or more markers on the display of the device, and wherein the artificial reality device determines the location for second content by identifying the one or more markers on the display of the device.

* * * * *